(12) United States Patent
Takizawa et al.

(10) Patent No.: US 9,389,005 B2
(45) Date of Patent: Jul. 12, 2016

(54) TWO-STAGE COMPRESSION REFRIGERATION CYCLE DEVICE

(75) Inventors: Ryo Takizawa, Chita-gun (JP); Masami Taniguchi, Nagoya (JP); Jun Yamazaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 343 days.

(21) Appl. No.: 13/881,945

(22) PCT Filed: Sep. 6, 2011

(86) PCT No.: PCT/JP2011/004971
§ 371 (c)(1),
(2), (4) Date: Apr. 26, 2013

(87) PCT Pub. No.: WO2012/056623
PCT Pub. Date: May 3, 2012

(65) Prior Publication Data
US 2013/0213084 A1 Aug. 22, 2013

(30) Foreign Application Priority Data

Oct. 29, 2010 (JP) ................................. 2010-244556

(51) Int. Cl.
*F25B 1/10* (2006.01)
*F04C 23/00* (2006.01)
(Continued)

(52) U.S. Cl.
CPC ................ *F25B 1/10* (2013.01); *F04C 23/001* (2013.01); *F04C 28/02* (2013.01); *F04C 28/06* (2013.01);
(Continued)

(58) Field of Classification Search
CPC ................ F25B 1/10; F25B 2400/13; F25B 2600/2509; F25B 31/004; F25B 423/02; F25B 41/062; F25B 2600/2513; F25B 2600/027; F25B 2600/0271; F25B 2600/0272; F25B 2700/193; F25B 2700/1931; F25B 2700/1933

USPC ................................................. 62/228.3, 510
See application file for complete search history.

(56) References Cited

U.S. PATENT DOCUMENTS 4,411,141 A * 10/1983 Hara ..................... F25B 31/002
417/427
5,369,958 A * 12/1994 Kasai ..................... F24F 3/065
62/158
(Continued)

FOREIGN PATENT DOCUMENTS

JP 61-235648 A 10/1986
JP 5-44678 A 2/1993
(Continued)

OTHER PUBLICATIONS

International Search Report and Written Opinion of the ISA for PCT/JP2011/004971, ISA/JP, mailed Dec. 20, 2011.

*Primary Examiner* — Ljiljana Ciric
*Assistant Examiner* — Kristin Oswald
(74) *Attorney, Agent, or Firm* — Harness, Dickey & Pierce, P.L.C.

(57) ABSTRACT

In a two-stage compression refrigeration cycle device, a low-pressure side compression mechanism and a high-pressure side compression mechanism are intermittently operated to control such that the temperature of air blown into a freezer approaches a target temperature. Under the control, the high-pressure side compression mechanism is first stopped, and then the low-pressure side compression mechanism is stopped. Further, when a reference time has elapsed after driving the high-pressure side compression mechanism, then the low-pressure side compression mechanism is driven. The refrigeration cycle device can reduce a high-pressure side pressure difference upon driving the high-pressure side compression mechanism, and can also reduce a low-pressure side pressure difference upon driving the low-pressure side compression mechanism.

11 Claims, 6 Drawing Sheets

(51) Int. Cl.
*F04C 28/02* (2006.01)
*F04C 28/06* (2006.01)
*F25B 41/04* (2006.01)
F04C 18/02 (2006.01)
F04C 18/344 (2006.01)
F04C 18/356 (2006.01)

(52) U.S. Cl.
CPC ............. *F25B 41/04* (2013.01); *F04C 18/0215* (2013.01); *F04C 18/344* (2013.01); *F04C 18/356* (2013.01); *F04C 2270/19* (2013.01); *F04C 2270/215* (2013.01); *F25B 2400/13* (2013.01); *F25B 2600/021* (2013.01); *F25B 2600/111* (2013.01); *F25B 2600/112* (2013.01); *F25B 2600/2509* (2013.01); *F25B 2600/2513* (2013.01); *F25B 2700/21161* (2013.01); *F25B 2700/21171* (2013.01); *Y02B 30/741* (2013.01); *Y02B 30/743* (2013.01)

(56) References Cited

U.S. PATENT DOCUMENTS

| | | | | |
|---|---|---|---|---|
| 5,586,444 | A * | 12/1996 | Fung | F25B 49/022 318/610 |
| 5,752,391 | A * | 5/1998 | Ozaki et al. | 62/228.1 |
| 6,843,067 | B2 * | 1/2005 | Lee | F25B 49/022 62/175 |
| 7,240,502 | B2 * | 7/2007 | Cho | F25B 49/022 62/175 |
| 2002/0073721 | A1 * | 6/2002 | Seo | F25B 49/022 62/228.3 |
| 2003/0233838 | A1 * | 12/2003 | Lee | F25B 13/00 62/175 |
| 2005/0028552 | A1 * | 2/2005 | Nishijima | F25B 31/004 62/500 |
| 2005/0072173 | A1 * | 4/2005 | Yamasaki et al. | 62/196.2 |
| 2005/0183447 | A1 | 8/2005 | Matsumoto et al. | |
| 2006/0032252 | A1 * | 2/2006 | Lee | F24F 11/006 62/175 |
| 2006/0032267 | A1 * | 2/2006 | Kamimura et al. | 62/498 |
| 2006/0112705 | A1 * | 6/2006 | Jin | F25B 49/022 62/228.5 |
| 2006/0137385 | A1 * | 6/2006 | Take et al. | 62/498 |
| 2006/0137388 | A1 * | 6/2006 | Kakehashi et al. | 62/513 |
| 2006/0191288 | A1 * | 8/2006 | Radermacher et al. | 62/510 |
| 2006/0230782 | A1 * | 10/2006 | Imai et al. | 62/512 |
| 2006/0266057 | A1 * | 11/2006 | Yakumaru et al. | 62/160 |
| 2007/0151266 | A1 * | 7/2007 | Yakumaru et al. | 62/197 |
| 2008/0022706 | A1 * | 1/2008 | Sakimichi | F25B 1/10 62/190 |
| 2008/0236184 | A1 * | 10/2008 | Morozumi | F04C 18/3442 62/324.6 |
| 2008/0310966 | A1 | 12/2008 | Iwano et al. | |
| 2009/0071187 | A1 * | 3/2009 | Sakitani | F25B 9/06 62/468 |
| 2011/0113804 | A1 * | 5/2011 | Chin | F25B 1/04 62/222 |

FOREIGN PATENT DOCUMENTS

| | | |
|---|---|---|
| JP | 2004-028492 A | 1/2004 |
| JP | 2004-108334 A | 4/2004 |
| JP | 2007-147232 A | 6/2007 |
| JP | 2008-064421 A | 3/2008 |
| JP | 2008-297991 A | 12/2008 |
| JP | 2010-112579 A | 5/2010 |

* cited by examiner

TWO-STAGE COMPRESSION REFRIGERATION CYCLE DEVICE

CROSS-REFERENCE TO RELATED APPLICATIONS

This application is a 371 U.S. National Stage of International Application No. PCT/JP2011/004971, filed Sep. 6, 2011. This application claims priority to Japanese Patent Application No. 2010/244556, filed Oct. 29, 2010. The disclosures of the above applications are incorporated herein by reference.

TECHNICAL FIELD

The present invention relates to a two-stage compression refrigeration cycle device including a low-pressure side compression mechanism and a high-pressure side compression mechanism for increasing the pressure of refrigerant by multiple stages.

BACKGROUND ART

Conventionally, Patent Document 1 discloses a two-stage compression refrigeration cycle device for increasing the pressure of refrigerant (for example, helium gas) in multiple stages by use of a plurality of compression mechanisms connected in series. The refrigeration cycle device disclosed in Patent Document 1 employs a low-pressure side compression mechanism whose discharge capacity is larger than that of a high-pressure side compression mechanism to reduce the loads on the respective compression mechanisms.

In the two-stage compression refrigeration cycle using the low-pressure side compression mechanism whose discharge capacity is larger than that of the high-pressure side compression mechanism, both compression mechanisms are sometimes intended to be simultaneously started up under the state of pressure equalization with the distribution of pressure difference between high and low pressures equalized in the cycle, like upon the initial start-up. In this case, the discharge-side refrigerant pressure of the low-pressure side compression mechanism with the large discharge capacity might often become higher than the discharge-side refrigerant pressure of the high-pressure side compression mechanism, which results in the inversion of pressure.

For this reason, in the refrigeration cycle disclosed in Patent Document 1, when the compression mechanisms are intended to be started up under the pressure equalization, first, the high-pressure side compression mechanism with a small discharge capacity is started, and then the low-pressure side compression is started, so as to suppress the occurrence of the pressure inversion described above.

RELATED ART DOCUMENTS

Patent Documents

[Patent Document 1]
Japanese Unexamined Patent Publication No. 61-235648
Patent Document 1 discloses the order of start-up of the compression mechanisms upon start-up in the state of the pressure equalization, but fails to disclose the order of start-up of the compression mechanisms in the state with a difference between the high and low pressures remaining in the cycle.

However, for example, in some refrigeration cycles for transferring a driving force to a compression mechanism via an electromagnetic clutch or the like, the compression mechanism is intermittently operated such that a refrigerant evaporation temperature of an evaporator becomes a desired target temperature. In such a refrigeration cycle, the compression mechanism often has to be actuated or started-up in the state with the difference between the high and low pressures remaining in the cycle.

Under the state with the difference between the high and low pressure remaining in the cycle, operating components of the compression mechanism are pushed against a fixing member under a load caused due to the difference between the high and low pressures. The start-up of the compression mechanism in this state wears the components of the compression mechanism to adversely affect the durability and lifetime of the compression mechanism.

The state with the difference between the high and low pressure remaining in the cycle might adversely affect the durability and lifetime of the respective compression mechanisms even when the high-pressure side compression mechanism is first actuated and the low-pressure side compression mechanism is then actuated, as described in Patent Document 1.

DISCLOSURE OF THE INVENTION

The present invention has been made in view of the above points, and it is an object of the present invention to provide a two-stage compression refrigeration cycle device adapted to intermittently operate a low-pressure side compression mechanism and a high-pressure side compression mechanism and which can protect both the low-pressure side and high-pressure side compression mechanisms.

According to an aspect of the present invention, a two-stage compression refrigeration cycle device includes a low-pressure side compression mechanism which compresses a low-pressure refrigerant into an intermediate-pressure refrigerant and discharges the compressed refrigerant therefrom, a high-pressure side compression mechanism which compresses the intermediate-pressure refrigerant discharged from the low-pressure side compression mechanism into a high-pressure refrigerant and discharges the compressed refrigerant therefrom, a radiator in which the high-pressure refrigerant discharged from the high-pressure side compression mechanism is heat-exchanged with outside air to radiate heat from the refrigerant, an intermediate-pressure expansion valve which decompresses and expands the high-pressure refrigerant flowing from the radiator into the intermediate-pressure refrigerant to cause the intermediate-pressure refrigerant to flow into a suction side of the high-pressure side compression mechanism, a low-pressure expansion valve which decompresses and expands the high-pressure refrigerant flowing from the radiator into the low-pressure refrigerant, and an evaporator in which the low-pressure refrigerant decompressed and expanded by the low-pressure expansion valve is evaporated by exchanging heat with a fluid blown into a cooling space to cause the evaporated refrigerant to flow into a suction side of the low-pressure side compression mechanism. Furthermore, in the two-stage compression refrigeration cycle device, the low-pressure side compression mechanism and the high-pressure side compression mechanism are intermittently controlled such that a temperature of the fluid exchanging heat with the low-pressure refrigerant at the evaporator is adjusted to approach a target temperature. Furthermore, when the low-pressure side compression mechanism and the high-pressure side compression mechanism are restarted after both the compression mechanisms are stopped, one compression mechanism having a pressure difference that is a smaller one of a low-pressure side pressure difference and a high-pressure side pressure difference is first started up. Here, said low-pressure side pressure difference is obtained by subtracting a low-pressure suction side refrigerant pressure from a low-pressure discharge side refrigerant pressure of the low-pressure side compression mechanism, and said high-pressure side pressure difference is obtained by subtracting the low-pressure discharge side refrigerant pressure from a high-pressure discharge side refrigerant pressure of the high-pressure side compression mechanism. In addition, the other compression mechanism is then started up by reducing the larger one of the low-pressure side compression difference and the high-pressure side compression difference.

Thus, upon restarting the low-pressure side compression mechanism and the high-pressure side compression mechanism after stopping both the compression mechanisms, one compression mechanism whose pressure difference is a smaller one of the low-pressure side pressure difference and the high-pressure side difference is first started even under the state with a difference between the high and low pressure remaining in the cycle. The refrigeration cycle device of the present invention can surely protect the compression mechanisms as compared to the case where the other compression mechanism whose pressure difference is a larger one is first started.

The phrase "difference between the high and low pressures remaining in the cycle of the two-stage compression refrigeration cycle" as used herein means the state of existence of at least one of the low-pressure side pressure difference and the high-pressure side pressure difference.

In the two-stage compression refrigeration cycle device, the discharge side of the low-pressure side compression mechanism has the same pressure as the suction side of the high-pressure side compression mechanism. As described in the following embodiments, once one compression mechanism is started up, a pressure difference obtained by subtracting the suction-side refrigerant pressure of one compression mechanism from the discharge side refrigerant pressure thereof can be enlarged to thereby reduce a pressure difference of the other compression mechanism not operating.

Thus, the other compression mechanism can also be started up with its pressure difference reduced. As a result, the refrigeration cycle device of the present invention can achieve protection of both one compression mechanism first started, and the other compression mechanism then started.

For example, in stopping the low-pressure side compression mechanism and the high-pressure side compression mechanism, one compression mechanism may be first stopped, and then the other compression mechanism may be stopped. In this case, since the one compression mechanism is first stopped, the pressure increasing capacity of the other compression mechanism not stopping yet can reduce the pressure difference of the one compression mechanism. As a result, when stopping and restarting both the compression mechanisms, the low-pressure side pressure difference and the high-pressure side pressure difference can surely differ from each other. Thus, the refrigeration cycle device of the invention can certainly protect the one compression mechanism first started.

Alternatively, in stopping the low-pressure side and high-pressure side compression mechanisms, both compression mechanisms may be simultaneously stopped, and the throttle opening degree of any one of the intermediate-pressure expansion valve and the low-pressure expansion valve may be increased. In this case, the high-pressure side pressure difference can be quickly reduced, and the low-pressure side pressure difference can be quickly reduced by increasing the throttle opening degree of the low-pressure expansion valve.

As a result, in stopping and then restarting both the compression mechanisms, the low-pressure side pressure difference and the high-pressure side pressure difference can surely differ from each other. Thus, the refrigeration cycle device of the present invention can certainly protect the one compression mechanism first started.

Alternatively, an oil separator may be provided for separating a refrigeration machine oil contained in the refrigerant discharged from the one compression mechanism from the refrigerant to return the oil to the suction side of the one compression mechanism. With this arrangement, the low-pressure side compression mechanism and the high-pressure side compression mechanism are stopped, whereby the pressure difference of the one compression mechanism can be reduced by communicating the high-pressure side of the one compression mechanism with the low-pressure side thereof via the oil separator on the one compression mechanism side. As a result, in stopping and restarting both compression mechanisms, the low-pressure side pressure difference and the high-pressure side pressure difference can surely differ from each other. Thus, the refrigeration cycle device of the present invention can certainly protect the one compression mechanism first started.

When one of the low-pressure side compression mechanism and the high-pressure side compression mechanism is stopped prior to the other, the oil separator may be provided on the one compression mechanism side to be first stopped.

In order to simultaneously stop the low-pressure side compression mechanism and the high-pressure side compression mechanism, and to increase the throttle opening degree of the intermediate-pressure expansion valve, the oil separator is desirably provided on the high-pressure side compression mechanism side. In contrast, in order to increase the throttle opening degree of the low-pressure expansion valve, the oil separator is desirably provided on the low-pressure side compression mechanism side.

In the two-stage compression refrigeration cycle device, one compression mechanism may be a high-pressure side compression mechanism, and the other compression mechanism may be a low-pressure side compression mechanism. In this case, the other compression mechanism is the low-pressure side compression mechanism connected to the evaporator for evaporating refrigerant to exhibit a heat absorption effect. Even when the high-pressure side compression mechanism is stopped, variations in low-pressure side pressure difference can be suppressed. Thus, the refrigeration cycle device of the present invention can suppress variations in refrigerant evaporation pressure (refrigerant evaporation temperature) of the evaporator in stopping the high-pressure side and low-pressure side compression mechanisms.

In restarting the compression mechanisms, the high-pressure side compression mechanism is first started up as the one compression mechanism. The suction side refrigerant pressure of the high-pressure side compression mechanism, that is, the discharge side refrigerant pressure of the low-pressure side compression mechanism would be reduced to decrease the low-pressure side pressure difference. Even in this case, the suction side refrigerant pressure of the low-pressure side compression mechanism is less likely to be changed.

Thus, also in restarting the high-pressure side and low-pressure side compression mechanisms, the refrigeration cycle device of the present invention can suppress variations in refrigerant evaporation pressure (refrigerant evaporation temperature) of the evaporator.

As a result, even when the low-pressure side and high-pressure side compression mechanisms are intermittently controlled, the refrigeration cycle device of the present invention can suppress variations in refrigerant evaporation temperature of the evaporator. Further, the refrigeration cycle device can also reduce the power consumption of the low-pressure side and high-pressure side compression mechanisms for decreasing the refrigerant evaporation temperature of the evaporator.

Alternatively, in starting up the low-pressure side and high-pressure side compression mechanisms, when a pressure difference of the other compression mechanism is equal to or less than a predetermined reference pressure difference after starting up one compression mechanism, then the other compression mechanism may be started up.

Alternatively, in starting up the low-pressure side and high-pressure side compression mechanisms, when a predetermined reference hold time has elapsed after starting up one compression mechanism, then the other compression mechanism may be started up. In this case, the refrigeration cycle device of the present invention can wait until the pressure difference of the other compression mechanism is sufficiently reduced, thereby surely protecting the other compression mechanism.

Further, the intermediate-pressure expansion valve decompresses and expands one high-pressure refrigerant branched by the branching portion for branching a flow of high-pressure refrigerant flowing from the radiator, and the low-pressure expansion valve decompresses and expands the other high-pressure refrigerant branched by the branching portion. Additionally, an intermediate heat exchanger may be provided for exchanging heat between the low-pressure refrigerant decompressed and expanded by the intermediate-pressure expansion valve and the other high-pressure refrigerant branched by the branching portion.

BRIEF DESCRIPTION OF DRAWINGS

FIG. 4 (a) is a time chart showing changes in refrigerant pressures Pd, Pm, and Ps under intermittent control of the two-stage compression refrigeration cycle device in the first embodiment, and (b) is a time chart showing changes in refrigerant pressure Pd, Pm, and Ps under intermittent control of a two-stage compression refrigeration cycle device in a comparative example;

FIG. 5 (a) is a time chart showing a change in air temperature Tfr in a freezer under an intermittent control of the two-stage compression refrigeration cycle device in the first embodiment, and (b) is a time chart showing a change in air temperature Tfr in a freezer under intermittent control of the two-stage compression refrigeration cycle device in the comparative example;

EMBODIMENTS FOR CARRYING OUT THE INVENTION

First Embodiment

Figure 1:
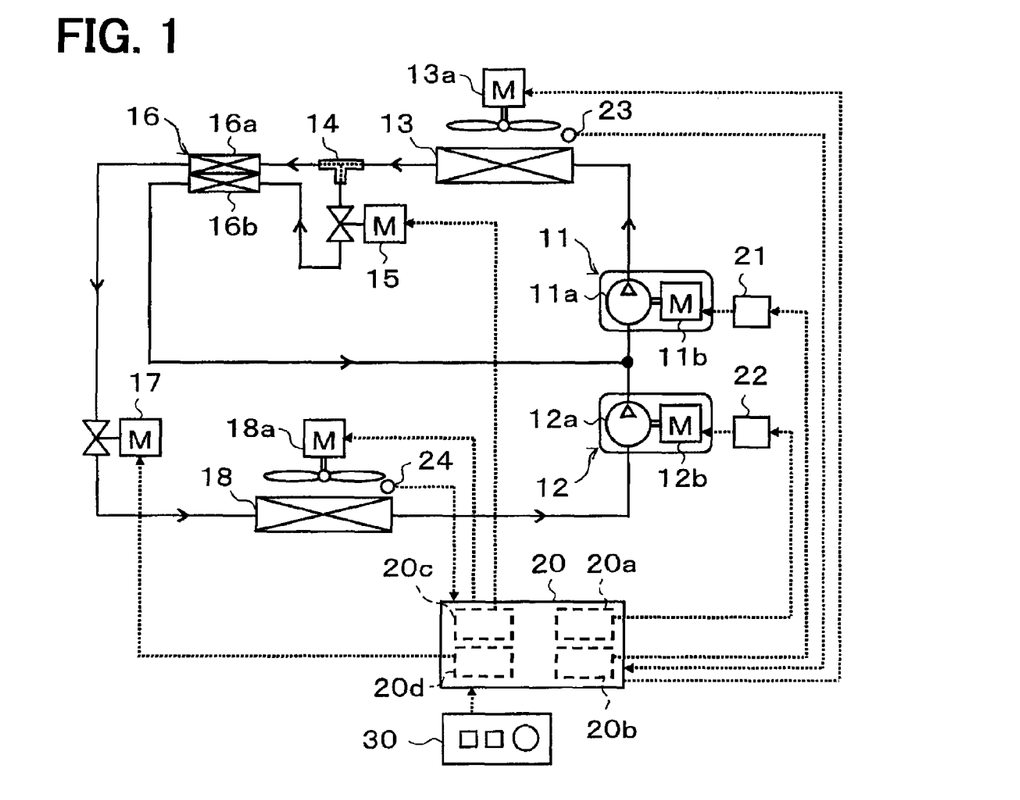
FIG. 1 is an entire configuration diagram of a two-stage compression refrigeration cycle device in a first embodiment.

Referring to FIGS. 1 to 5, a first embodiment of the invention will be described below. FIG. 1 shows an entire configuration diagram of a two-stage compression refrigeration cycle device 10 of the first embodiment. The two-stage compression refrigeration cycle 10 is applied to a refrigeration machine, and serves to cool the blast air blown into a freezer as a space for cooling down to an ultralow temperature of, for example, about −30 to −0° C.

As shown in FIG. 1, the two-stage compression refrigeration cycle device 10 includes two compressors, namely, a high-pressure side compressor 11 and a low-pressure side compressor 12. The cycle device 10 serves to increase the pressure of the refrigerant circulating through the cycle in multiple stages. The refrigerant used in this embodiment can be normal fluorocarbon refrigerant (for example, R404A). Refrigeration machine oil (oil) for lubricating sliding portions of the low-pressure side compressor 12 and the high-pressure side compressor 11 is mixed into the refrigerant, so that a part of the refrigeration machine oil circulates through the cycle together with the refrigerant.

The low-pressure side compressor 12 is an electric compressor which includes a low-pressure side compression mechanism 12a for compressing the low-pressure refrigerant into the intermediate-pressure refrigerant and discharging the compressed refrigerant therefrom, and a low-pressure side electric motor 12b for rotatably driving the low-pressure side compression mechanism 12a. The low-pressure side compression mechanism 12a is a fixed displacement compression mechanism whose discharge capacity is fixed. Specifically, the low-pressure side compression mechanism 12a can employ various types of compression mechanisms, including a scroll compression mechanism, a vane compression mechanism, a rolling piston compression mechanism, and the like.

The low-pressure side electric motor 12b is an AC motor whose operation (number of revolutions) is controlled by an alternating current output from a low-pressure side inverter 22. The low-pressure side inverter 22 outputs the AC with a frequency corresponding to a control signal output from a refrigeration machine controller 20 to be described later. Under control of the frequency, the refrigerant discharge capacity of the low-pressure side compressor 12 (specifically, the low-pressure side compression mechanism 12a) is changed.

Thus, in this embodiment, the low-pressure side electric motor 12b serves as discharge capacity changing means for the low-pressure side compressor 12. Apparently, the low-pressure side electric motor 12b may employ a DC motor whose number of revolutions is controlled by a control voltage output from the refrigeration machine controller 20. A discharge port of the low-pressure side compressor 12 (specifically, the low-pressure side compression mechanism 12a) is coupled to a suction port of the high-pressure side compressor 11.

Thus, a low-pressure discharge side refrigerant pressure Pm of the low-pressure side compression mechanism 12a is at the same level as a high-pressure suction side refrigerant pressure of the high-pressure side compression mechanism 11a. The high-pressure side compressor 11 has the same basic structure as that of the low-pressure side compressor 12. Thus, the high-pressure side compressor 11 is an electric compressor comprised of a high-pressure side compression mechanism 11a and a high-pressure side electric motor 11b. The high-pressure side compression mechanism 11a compresses the intermediate-pressure refrigerant discharged from the low-pressure side compressor 12 into a high-pressure refrigerant, and discharges the compressed refrigerant therefrom.

The high-pressure side compression mechanism 11a is comprised of a fixed displacement compression mechanism whose discharge capacity is fixed. The high-pressure side electric motor 11b has its number of revolutions controlled by the alternating current output from a high-pressure side inverter 21. The compression ratio of the high-pressure side compression mechanism 11a is substantially the same as that of the low-pressure side compression mechanism 12a in this embodiment.

The high-pressure side compressor 11 and the low-pressure side compressor 12 of this embodiment have a discharge valve (not shown). Each discharge valve serves as a check valve for preventing backflow of the refrigerant discharged from the compression mechanisms 11a and 12a into the compressors 11 and 12.

A discharge port of the high-pressure side compressor 11 (specifically, the high-pressure side compression mechanism 11a) is coupled to a refrigerant inlet side of a radiator 13. The radiator 13 is a heat exchanger for heat dissipation that exchanges heat between the high-pressure refrigerant discharged from the high-pressure side compressor 11 and an air outside the freezer (outside air) blown by a cooling fan 13a to dissipate heat from the high-pressure refrigerant so as to cool the refrigerant.

The cooling fan 13a is an electric blower whose number of revolutions (from which the amount of blast air) is controlled by a control voltage output from the refrigeration machine controller 20. The two-stage compression refrigeration cycle device 10 of this embodiment forms a subcritical refrigeration cycle in which the high-pressure side refrigerant pressure does not exceed a critical pressure of the refrigerant using a fluorocarbon refrigerant as the refrigerant. Thus, the radiator 13 serves as a condenser for condensing the refrigerant.

A branching portion 14 for branching the flow of refrigerant from the radiator 13 is coupled to a refrigerant outlet of the radiator 13. The branching portion 14 has a three-way joint structure with three inlet/outlet ports. One of the inlet/outlet ports serves as a refrigerant inlet, and two of them serve as a refrigerant outlet. Such a branching portion 14 may be formed by connecting pipes, or may be formed by providing a plurality of refrigerant passages in a metal or resin block.

One of the refrigerant outlets of the branching portion 14 is coupled to the inlet side of an intermediate-pressure expansion valve 15, and the other outlet of the branching portion 14 is coupled to the inlet side of a high-pressure refrigerant flow path 16a of an intermediate heat exchanger 16. The intermediate-pressure expansion valve 15 is an electric expansion valve that compresses and expands the high-pressure refrigerant flowing from the radiator 13 into the intermediate-pressure refrigerant.

Specifically, the intermediate-pressure expansion valve 15 has a valve body whose throttle opening degree is variable, and an electric actuator comprised of a stepping motor for varying the throttle opening degree of the valve body. The intermediate-pressure expansion valve 15 has its operation controlled by a control signal output from the refrigeration machine controller 20.

In this embodiment, specifically, a throttle opening degree (refrigerant flow rate) of the intermediate-pressure expansion valve 15 is controlled such that the degree of superheat of the refrigerant on the suction side of the high-pressure side compressor 11 is within a predetermined range. The intermediate-pressure expansion valve 15 can completely close the throttle opening degree to interrupt the flow of refrigerant in a refrigerant pipe from one refrigerant outlet of the branching portion 14 into an inlet of an intermediate-pressure refrigerant flow path 16b of the intermediate heat exchanger 16.

The outlet of the intermediate-pressure expansion valve 15 is coupled to the inlet of the intermediate-pressure refrigerant flow path 16b of the intermediate heat exchanger 16. The intermediate heat exchanger 16 exchanges heat between an intermediate-pressure refrigerant decompressed and expanded by the intermediate-pressure expansion valve 15 to flow through the intermediate-pressure refrigerant flow path 16b, and the other high-pressure refrigerant branched by the branching portion 14 to flow through the high-pressure refrigerant flow path 16a.

The high-pressure refrigerant has its temperature decreased by being decompressed. Thus, in the intermediate heat exchanger 16, the intermediate-pressure refrigerant flowing through the intermediate-pressure refrigerant flow path 16b is heated, while the high-pressure refrigerant flowing through the high-pressure refrigerant flow path 16a is cooled.

Specifically, the heat exchanger 16 employs a double-pipe heat exchanger structure comprised of an outside pipe forming the high-pressure refrigerant flow path 16a, and an inside pipe forming the intermediate-pressure refrigerant flow path 16b located inside the flow path 16a. Apparently, the high-pressure refrigerant flow path 16a may be formed as the inside pipe, and the intermediate-pressure refrigerant flow path 16b as the outside pipe. Alternatively, refrigerant pipes forming the high-pressure refrigerant flow path 16a and the intermediate-pressure refrigerant flow path 16b may be coupled to each other to exchange heat therebetween.

Alternatively, specifically, the intermediate heat exchanger 16 may have another heat exchanger structure which employs a meandering tube or a plurality of tubes as the high-pressure refrigerant flow path 16a for allowing the refrigerant flow therethrough to form the intermediate-pressure refrigerant flow path 16b between the adjacent tubes. The heat exchanger structure is provided with a wave-like corrugated fin or a plate fin in the form of plates for promoting the heat exchange between the high-pressure refrigerant and the intermediate-pressure refrigerant.

The intermediate heat exchanger 16 shown in FIG. 1 employs a parallel flow heat exchanger in which the flow direction of the high-pressure refrigerant flowing through the high-pressure refrigerant flow path 16a is the same as that of the intermediate-pressure refrigerant flowing through the intermediate-pressure refrigerant flow path 16b. Alternatively, the intermediate heat exchanger 16 may employ a counterflow heat exchanger in which the flow direction of the high-pressure refrigerant flowing through the high-pressure flow path 16a is opposite to that of the intermediate-pressure refrigerant flowing through the intermediate-pressure refrigerant flow path 16b.

The outlet side of the intermediate-pressure refrigerant flow path 16b of the intermediate heat exchanger 16 is coupled to the suction port side of the above high-pressure side compressor 11 (specifically, the high-pressure side compression mechanism 11a) via a check valve (not shown). Thus, the high-pressure side compression mechanism 11a of this embodiment sucks thereinto a mixture of the intermediate-pressure refrigerant flowing from the intermediate-pressure refrigerant flow path 16b and the intermediate-pressure refrigerant discharged from the low-pressure side compressor 12.

In contrast, the outlet side of the high-pressure refrigerant flow path 16a of the intermediate heat exchanger 16 is coupled to the inlet side of a low-pressure expansion valve 17. The low-pressure expansion valve 17 is an electric expansion valve for decompressing and expanding the high-pressure refrigerant flowing from a radiator 3 into the low-pressure refrigerant. The low-pressure expansion valve 17 has the same basic structure as that of the intermediate-pressure expansion valve 15.

Thus, the low-pressure expansion valve 17 includes a valve body whose throttle opening degree is variable, and an electric actuator for varying the throttle opening degree of the valve body. The low-pressure expansion valve 17 has its operation controlled by a control signal output from the refrigeration machine controller 20. In this embodiment, specifically, the throttle opening degree (refrigerant flow rate) of the low-pressure expansion valve 17 is controlled such that the degree of superheat of the refrigerant on the suction side of the low-pressure side compressor 12 is within a predetermined range.

The low-pressure expansion valve 17 can also completely close the throttle opening degree to interrupt the flow of refrigerant in a refrigerant pipe from the high-pressure refrigerant flow path 16a of the intermediate heat exchanger 16 to the inlet side of the evaporator 18.

The outlet side of the low-pressure expansion valve 17 is coupled to the refrigerant inflow side of the evaporator 18. The evaporator 18 is a heat exchanger for heat absorption which exchanges heat between the low-pressure refrigerant decompressed and expanded by the low-pressure expansion valve 17 and the blast air blown by a blower fan 18a and circulating through the freezer to thereby exhibit the effect of heat absorption by evaporating the low-pressure refrigerant. Thus, the fluid for heat exchange in this embodiment is blast air circulating and blown in the freezer.

The blower fan 18a is an electric blower whose number of revolutions (amount of blast air) is controlled by a control voltage output from the refrigeration machine controller 20. The refrigerant outflow port of the evaporator 18 is coupled to the suction port side of the low-pressure side compressor 12 (specifically, the low-pressure side compression mechanism 12a).

Next, an electric controller of this embodiment will be described later. The refrigeration machine controller 20 includes the known microcomputer including a CPU for performing control processing or computation processing, and a storage circuit, such as a ROM or a RAM, for storing therein programs or data; an output circuit for outputting therefrom a control signal or a control voltage to a device for control; an input circuit into which a detection signal from each sensor is input; and a power supply circuit.

The output side of the refrigeration machine controller 20 is coupled to the above low-pressure side inverter 22, high-pressure side inverter 21, cooling fan 13a, intermediate-pressure expansion valve 15, low-pressure expansion valve 17, and blower fan 18a, as the devices to be controlled. The refrigeration machine controller 20 is adapted to control the operation of each of these devices to be controlled.

The refrigeration machine controller 20 includes a combination of respective control means for controlling the devices to be controlled. The respective structures (hardware and software) for controlling the operations of the devices to be controlled in the refrigeration machine controller 20 form the control means for controlling the respective devices for control.

In this embodiment, low-pressure side discharge capacity control means 20a has the structure (hardware and software) for controlling the refrigerant discharge capacity of the low-pressure side compression mechanism 12a by controlling the operation of the low-pressure side inverter 22. And, high-pressure side discharge capacity control means 20b has the structure for controlling the refrigerant discharge capacity of the high-pressure side compression mechanism 11a by controlling the operation of the high-pressure side inverter 21.

Thus, the number of revolutions of the low-pressure side electric motor 12b and the number of revolutions of the high-pressure side electric motor 11b can be independently controlled by the low-pressure side discharge capacity control means 20a and the high-pressure side discharge capacity control means 20b.

Intermediate-pressure throttle opening degree control means 20c has the structure for controlling the throttle opening degree of the intermediate-pressure expansion valve 15 by controlling the operation of the intermediate-pressure expansion valve 15. Low-pressure throttle opening degree control means 20d has the structure for controlling the throttle opening degree of the low-pressure expansion valve 17. Obviously, the low-pressure side and high-pressure side discharge capacity control means 20a and 20b and the intermediate-pressure and low-pressure throttle opening degree control means 20c and 20d may be comprised of respective individual controllers with respect to the refrigeration machine controller 20.

In contrast, the input side of the refrigeration machine controller 20 is coupled to an outside air temperature sensor 23, an in-freezer temperature sensor 24, and the like. The outside air temperature sensor 23 serves as outside air temperature detection means for detecting an outside air temperature Tam of air outside the freezer (outside air) that exchanges heat with the high-pressure refrigerant at the radiator 13. The in-freezer temperature sensor 24 serves as in-freezer temperature detection means for detecting an air temperature Tfr of the blast air that exchanges heat with the low-pressure refrigerant at the evaporator 18. Detection signals from these sensors are input to the refrigeration machine controller 20.

The input side of the refrigeration machine controller 20 is coupled to an operation panel 30. The operation panel 30 is provided with an operating/stopping switch serving as request signal output means for outputting an operation request signal or a stopping request signal of the refrigeration machine, and a temperature setting switch serving as target temperature setting means for setting an in-freezer temperature (target cooling temperature) Tset. Operation signals from these switches are input to the refrigeration machine controller 20.

Next, the operation of the two-stage compression refrigeration cycle device 10 with the above structure in this embodiment will be described below. When an operation request signal is output by turning on (ON) of an operating/stopping switch of the operation panel 30, the refrigeration machine controller 20 of this embodiment executes a program for control of the refrigeration machine pre-stored in a storage circuit.

Once the program is executed, the refrigeration machine controller 20 reads detection signals from the above various sensors 23 and 24 connected to the input side of the controller, and an operation signal from the operation panel 30. Then, based on the detection signals and operation signal read, the controller 20 outputs the control signal to devices to be controlled, namely, the high-pressure side compressor 11, the low-pressure side compressor 12, or the like coupled to the output side of the controller to thereby control the operation of the device.

For example, when the air temperature Tfr corresponding to the in-freezer temperature of the freezer is equal to or higher than an operating temperature obtained by adding a first reference temperature (2° C. in this embodiment) to a target temperature Tset, the high-pressure side compressor 11 and the low-pressure side compressor 12 are operated as follows. That is, the high-pressure side and low-pressure side compressors 11 and 12 are operated such that the high-pressure side compression mechanism 11a and the low-pressure side compression mechanism 12a exhibit respective predetermined discharge capacities. In contrast, when the air temperature Tfr is equal to or less than a stopping temperature obtained by subtracting a second reference temperature (2° C. in this embodiment) from the target temperature Tset, the high-pressure side compressor 11 and the low-pressure side compressor 12 are stopped.

In short, the refrigeration machine controller 20 of this embodiment performs intermittent control that involves intermittently driving the high-pressure side compression mechanism 11a and the low-pressure side compression mechanism 12a such that the temperature of blast air circulating and blown into the freezer approaches the preset target temperature Tset. A difference between the operating temperature and the stopping temperature is set as a width of a hysteresis for preventing the control hunting.

Until the operating/stopping switch of the operation panel 30 is turned OFF and the refrigeration machine is required to be stopped, the refrigeration machine controller 20 performs a control routine at predetermined control intervals. The routine involves reading the detection signal and operation signal as mentioned above, and then controlling the operation of the device for control, in that order.

Figure 2:
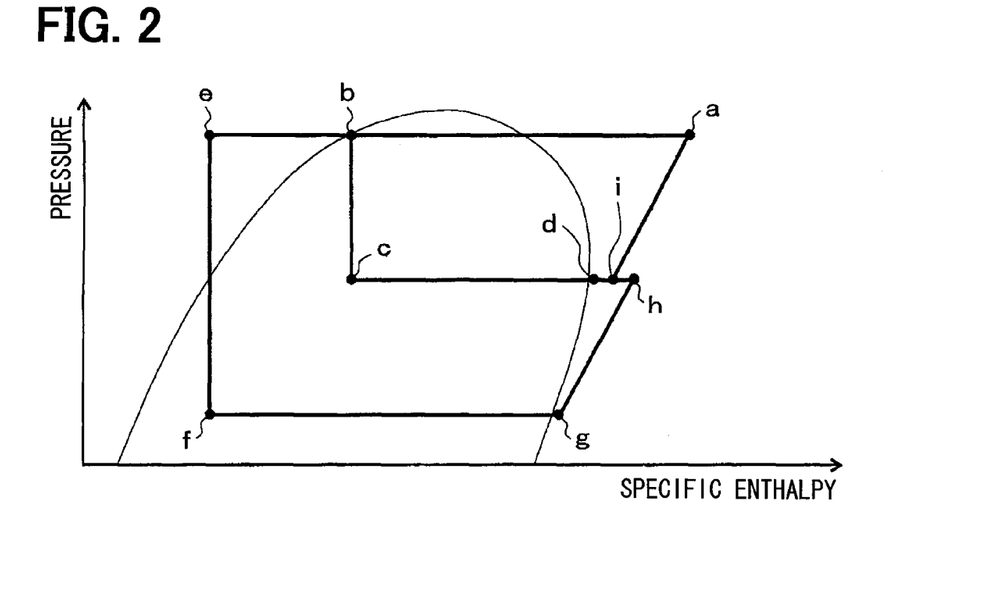
FIG. 2 is a Mollier diagram showing the state of refrigerant at the two-stage compression refrigeration cycle device in the first embodiment.

When both the high-pressure side compression mechanism 11a and the low-pressure side compression mechanism 12a are operating in the two-stage compression refrigeration cycle device 10, the state of the refrigerant changes as shown in the Mollier diagram of FIG. 2. Specifically, a high-pressure refrigerant (corresponding to a point a in FIG. 2) discharged from the high-pressure side compressor 11 flows into the radiator 13 and exchanges heat with air outside the freezer blown from the cooling fan 13a to be cooled (from the point a to a point b in FIG. 2).

The flow of refrigerant flowing from the radiator 13 is branched by the branching portion 14. The refrigerant flowing from one refrigerant outlet of the branching portion 14 is decompressed and expanded into an intermediate-pressure refrigerant by the intermediate pressure expansion valve 15 (from the point b to a point c in FIG. 2). At this time, the throttle opening degree of the intermediate-pressure expansion valve 15 is controlled such that the degree of superheat of the refrigerant on the suction side of the high-pressure side compressor 11 (corresponding to a point i in FIG. 2) is within the predetermined range.

The intermediate-pressure refrigerant decompressed and expanded by the intermediate-pressure expansion valve 15a flows into the intermediate-pressure refrigerant flow path 16b of the intermediate heat exchanger 16, and then exchanges heat with a high-pressure refrigerant flowing from the other refrigerant outlet of the branching portion 14 into and through the high-pressure refrigerant flow path 16a to thus increase its enthalpy (from the point c to a point d in FIG. 2). Conversely, the high-pressure refrigerant flowing through the high-pressure refrigerant flow path 16a is cooled to decrease its enthalpy (from the point b to a point e in FIG. 2).

The refrigerant flowing from the high-pressure refrigerant flow path 16a is decompressed and expanded into a low-pressure refrigerant by the low-pressure expansion valve 17 (from the point e to a point f in FIG. 2). At this time, the throttle opening degree of the low-pressure expansion valve 17 is controlled such that the degree of superheat of the refrigerant (corresponding to a point g in FIG. 2) on the suction side of the low-pressure side compressor 12 is within the predetermined range. This arrangement can solve the problem of liquid compression of the low-pressure side compressor 12.

The low-pressure refrigerant decompressed and expanded by the low-pressure expansion valve 17 flows into the evaporator 18 and exchanges heat with the air in the freezer circulating and blown by the blower fan 18a to evaporate itself, thus exhibiting a heat absorption effect (from the point f to the point g in FIG. 2). Thus, the air in the freezer is cooled. The refrigerant flowing from the evaporator 18 is sucked into the low-pressure side compressor 12, and then compressed and discharged by and from the compressor 12 (from the point g to a point h in FIG. 2).

The refrigerant flowing from the low-pressure side compressor 12 is mixed with a refrigerant flowing from the intermediate-pressure refrigerant flow path 16b of the intermediate heat exchanger 16 (from the point h to the point i, and from the point d to the point i in FIG. 2), and is then sucked into the high-pressure side compressor 11 again.

Further, this embodiment performs the intermittent control which involves intermittently driving the high-pressure side compression mechanism 11a and the low-pressure side compression mechanism 12a such that the in-freezer temperature approaches the target temperature Tset. That is, when the in-freezer temperature (air temperature Tfr) is equal to or less than the stopping temperature by operating both the low-pressure side compressor 12 and the high-pressure side compressor 11, the low-pressure side compressor 12 and the high-pressure side compressor 11 are stopped such that the in-freezer temperature approaches the target temperature Tset.

At this time, the refrigeration machine controller 20 stops the high-pressure side compression mechanism 11a prior to the low-pressure side compression mechanism 12a, and completely closes the low-pressure expansion valve 17. As a result, the high-pressure discharge side refrigerant pressure Pd of the high-pressure side compression mechanism 11a is decreased, while the high-pressure suction side refrigerant pressure (=low-pressure discharge side refrigerant pressure Pm) of the high-pressure compression mechanism 11a is increased by a pressure increasing capacity of the low-pressure side compression mechanism 12a.

Figure 3:
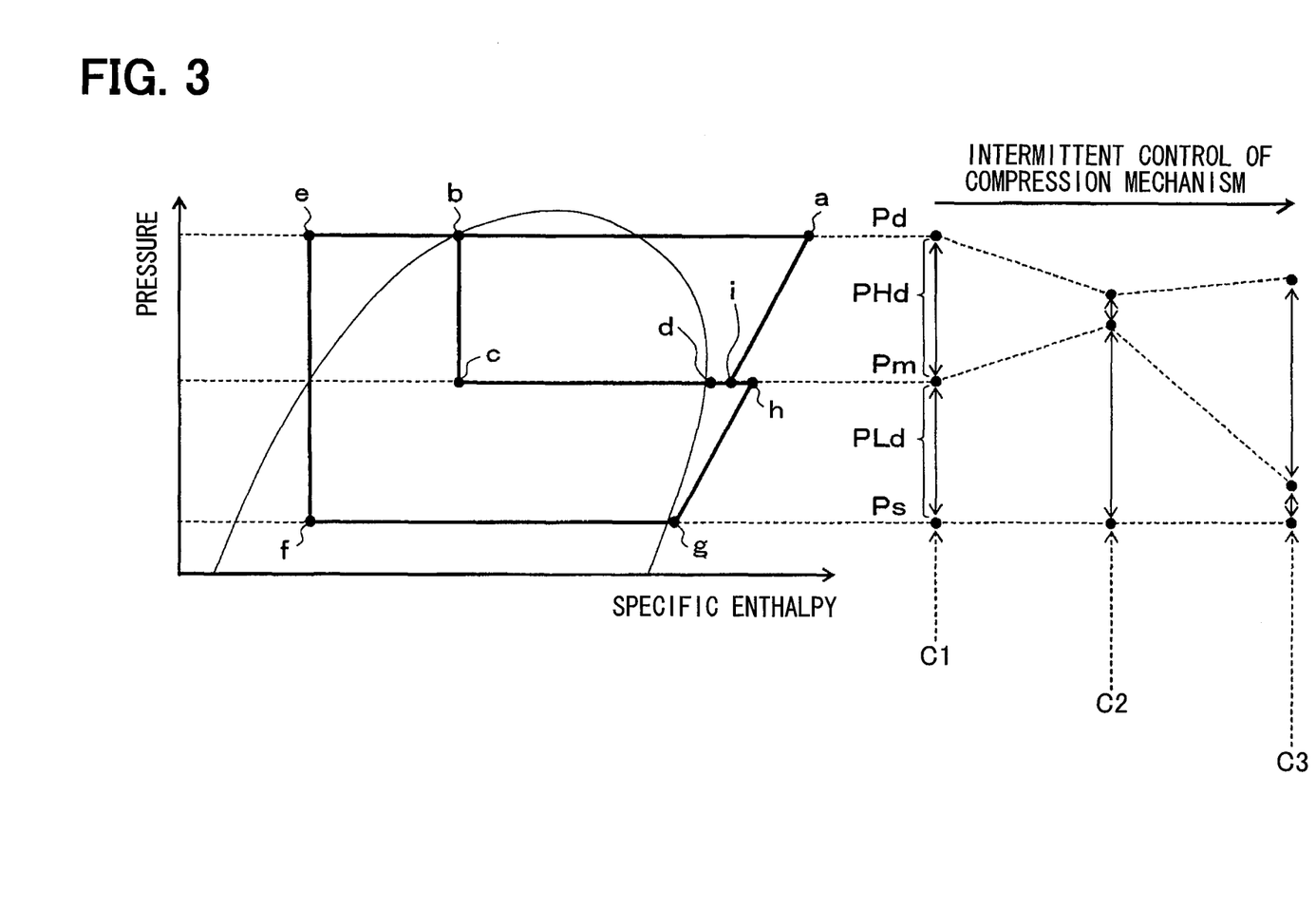
FIG. 3 is an explanatory diagram showing changes in high-pressure side pressure difference, and in low-pressure side pressure difference under intermittent control of the two-stage compression refrigeration cycle device in the first embodiment.

That is, a high-pressure side pressure difference PHd obtained by subtracting a low-pressure discharge side refrigerant pressure Pm of the low-pressure side compression mechanism 12a from a high-pressure discharge side refrigerant pressure Pd of the high-pressure side compression mechanism 11a is reduced. In contrast, when the high-pressure suction side refrigerant pressure of the high-pressure side compressor 11 (=low-pressure discharge side refrigerant pressure Pm) is increased, a low-pressure side pressure difference PLd obtained by subtracting a low-pressure suction side refrigerant pressure Ps from the low-pressure discharge side refrigerant pressure Pm of the low-pressure side compression mechanism 12a is enlarged. As shown in FIG. 3, C1 indicates a low-pressure side pressure difference PLd and a high-pressure side pressure difference PHd in operating both compression mechanisms 11a and 12a. C2 indicates a low-pressure side pressure difference PLd and a high-pressure side pressure difference PHd in stopping both compression mechanisms 11a and 12a. C3 indicates a low-pressure side pressure difference PLd and a high-pressure side pressure difference PHd in restarting the high-pressure side compression mechanism 11a.

Then, in this state, the low-pressure side compression mechanism 12a is stopped, so that as shown in FIG. 3, both the high-pressure side compressor 11 and the low-pressure side compressor 12 are stopped with the high-pressure side pressure difference PHd reduced as compared to the low-pressure side pressure difference PLd. FIG. 3 is an explanatory diagram showing changes in low-pressure side pressure difference PLd and high-pressure side pressure difference PHd of the low-pressure side compressor 12 and the high-pressure side compressor 11 in intermittent control as compared to the Mollier diagram of FIG. 2.

At this time, the low-pressure side compressor 12 is provided with a discharge valve with the low-pressure expansion valve 17 completely closed, which suppresses the inflow of the refrigerant from the discharge side of the low-pressure side compression mechanism 12a into the suction side (evaporator 18 side) thereof. Thus, the change in low-pressure suction side refrigerant pressure Ps, that is, the change in refrigerant evaporation pressure of the evaporator 18 is suppressed.

Further, when both the high-pressure side compressor 11 and the low-pressure side compressor 12 are stopped and the in-freezer temperature (air temperature Tfr) is equal to or more than the operating temperature, the low-pressure side and high-pressure side compressors 11 and 12 are actuated and operated again.

At this time, the refrigeration machine controller 20 starts up the high-pressure side compression mechanism 11a prior to the low-pressure side compression mechanism 12a. In short, the compressor mechanism whose pressure difference is a smaller one of the low-pressure side pressure difference PLd and the high-pressure side pressure difference PHd is started up. Specifically, in this embodiment, the high-pressure side compression mechanism 11a is one compression mechanism, and the low-pressure side compression mechanism 12a is the other compression mechanism.

Thus, the high-pressure discharge side refrigerant pressure Pd of the high-pressure side compression mechanism 11a is increased, while the high-pressure suction side refrigerant pressure (=low-pressure discharge side refrigerant pressure Pm) of the high-pressure side compression mechanism 11a is reduced. That is, the high-pressure side pressure difference PHd of the high-pressure side compression mechanism 11a is enlarged. In contrast, the suction side refrigerant pressure of the high-pressure side compressor 11 is decreased to thereby reduce the low-pressure side pressure difference PLd as shown in FIG. 3.

At this time, the low-pressure side compressor 12 is provided with the discharge valve and the low-pressure expansion valve 17 is completely closed, which suppresses the inflow of the refrigerant from the discharge side of the low-pressure side compression mechanism 12a into the suction side (evaporator 18 side) thereof. Thus, the change in low-pressure suction side refrigerant pressure Ps, that is, the change in refrigerant evaporation pressure of the evaporator 18 is suppressed even when the high-pressure side compression mechanism 11a is started up prior to the low-pressure side compression mechanism 12a.

When a predetermined reference hold time (10 seconds in this embodiment) has elapsed since the start-up of the high-pressure side compression mechanism 11a, the low-pressure expansion valve 17 is controlled to have a predetermined throttle opening degree, and the low-pressure side compression mechanism 12a is actuated or started up. The reference hold time is a value determined such that the low-pressure side pressure difference PLd can be decreased up to the level that does not adversely affect the durability and lifetime of the low-pressure side compression mechanism 12a even when the low-pressure side compression mechanism 12a is started up after the start-up of the high-pressure side compression mechanism 12a.

After start-up of the high-pressure side compression mechanism 11a, the low-pressure side compression mechanism 12a is started up. The operation of the two-stage compression refrigeration cycle device 10 while both the low-pressure side and high-pressure side compressors 11 and 12 are operating has been described above with reference to FIG. 2.

The two-stage compression refrigeration cycle device 10 of this embodiment is operated as mentioned above, and thus can obtain the following excellent effects.

The structure like this embodiment intermittently controls the high-pressure side compression mechanism 11a and the low-pressure side compression mechanism 12a such that the air temperature Tfr of the air inside the freezer approaches the target temperature Tset. In this structure, while the difference between the high and low pressure remains in the cycle, the high-pressure side compression mechanism 11a and the low-pressure side compression mechanism 12a sometimes have to be restarted up.

Under the state with a difference between the high and low pressure remaining in the cycle in the related art, operating components of the compression mechanisms are pushed against a fixing member under a load caused due to the difference between the high and low pressures. The start-up of the low-pressure side and high-pressure side compression mechanisms 11a and 12a in this state would wear the components of the compression mechanisms 11a and 12a to adversely affect the durability and lifetime of the compression mechanisms. Upon start-up of the compression mechanisms with a difference between the high and low pressures remaining in the cycle, the difference in pressure is desirably reduced as much as possible.

Figure 4:
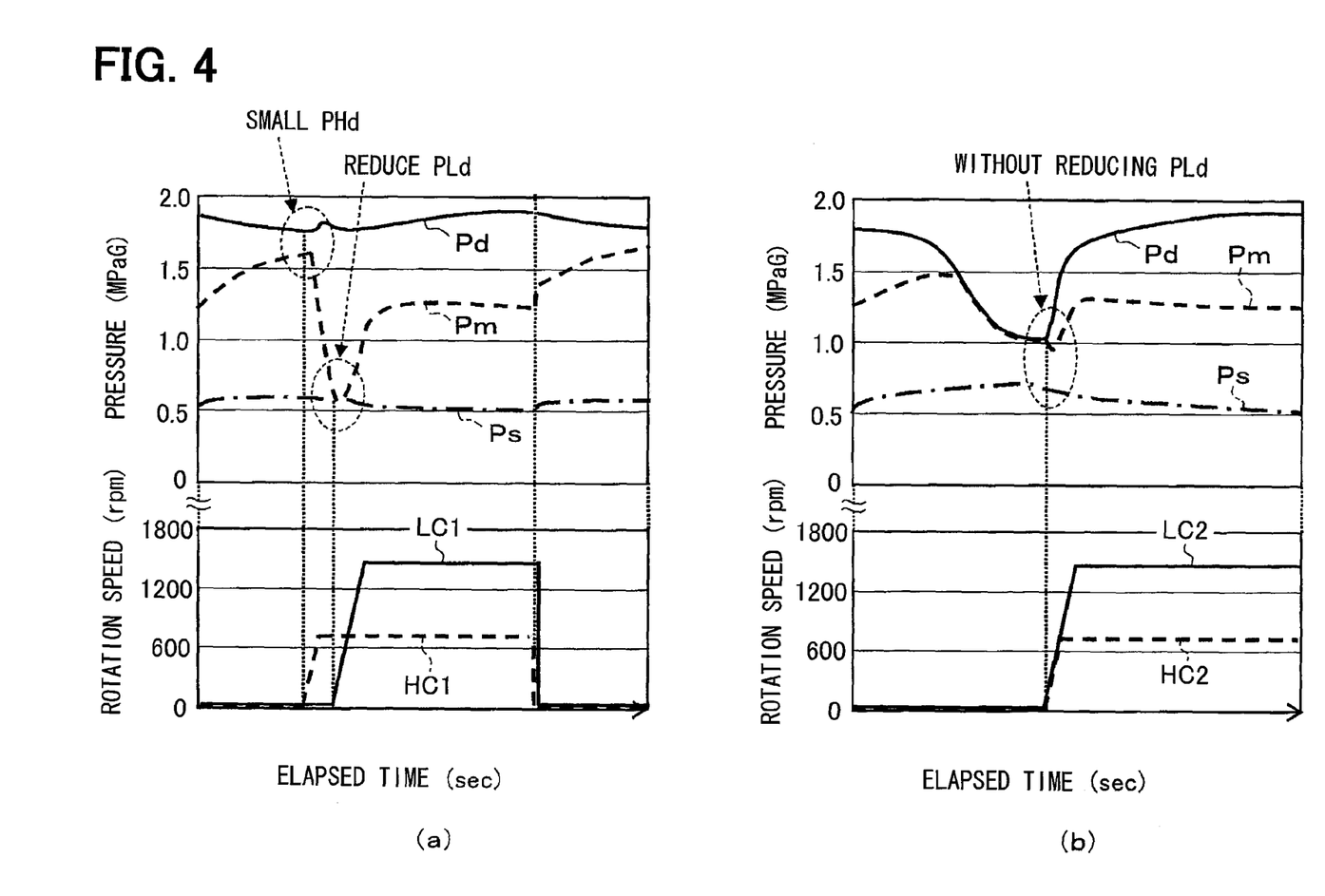

In contrast, in this embodiment, upon starting the respective compression mechanisms 11a and 12a, the difference between the high and low pressures in each of the compression mechanisms 11a and 12a can be reduced to protect the compression mechanisms 11a and 12a. This effect will be described below by comparing the intermittent control of the two-stage compression refrigeration cycle device between the present example and the comparative example, with reference to FIGS. 4 (a) and (b). In FIG. 4 (a), HC1 indicates the number of revolutions (rotation speed) of the high-pressure side compression mechanism 11a in this embodiment, and LC1 indicates the number of revolutions (rotation speed) of the low-pressure side compression mechanisms 12a of this embodiment. In FIG. 4(b), HC2 indicates the number of revolutions of the high-pressure side compression mechanism 11a in the comparative example, and LC2 indicates the number of revolutions of the low-pressure side compression mechanism 12a in the comparative example.

FIG. 4(a) is a time chart showing changes in high-pressure discharge side refrigerant pressure Pd (indicated by a solid line), low-pressure discharge side refrigerant pressure Pm (indicated by a broken line), and low-pressure suction side refrigerant pressure Ps (indicated by an alternate long and short dash line) in the intermittent control of the two-stage compression refrigeration cycle device 10 in this embodiment. FIG. 4(b) is a time chart showing changes in high-pressure discharge side refrigerant pressure Pd, low-pressure discharge side refrigerant pressure Pm, and low-pressure suction side refrigerant pressure Ps in intermittent control of the two-stage compression refrigeration cycle device in the comparative example.

In the two-stage compression refrigeration cycle device of the comparative example, when the compression mechanisms 11a and 12a are intended to be stopped in the intermittent control of the compression mechanisms 11a and 12a, both the compression mechanisms are simultaneously stopped, and the throttle opening degree of the intermediate-pressure expansion valve 15 is increased. And, when the compression mechanisms 11a and 12a are intended to be started up, both the compression mechanisms are simultaneously started, while reducing the opening degree of the intermediate-pressure expansion valve 15 to a previous level taken before stopping of the compression mechanisms 11a and 12a.

As can be seen from FIG. 4(b), in the two-stage compression refrigeration cycle device of the comparative example, the throttle opening degree of the intermediate-pressure expansion valve 15 is increased upon stopping the compression mechanisms 11a and 12a, so that the high-pressure side pressure difference PHd (=Pd−Pm) can be set to substantially zero (0), while the low-pressure side pressure difference PLd (=Pm−Ps) does not decrease. When both the compression mechanism 11a and 12a are simultaneously started up in this state, the durability and lifetime of the low-pressure side compression mechanism 12a is more likely to be adversely affected.

As shown in FIG. 4(a), in the two-stage compression refrigeration cycle device 10 of this embodiment, when the high-pressure side compression mechanism 11a and the low-pressure side compression mechanism 12a are intended to be stopped, the high-pressure side compression mechanism 11a is first stopped. At this time, the high-pressure side pressure difference PHd can be reduced by the pressure increasing capacity of the low-pressure side compression mechanism 12a not stopping yet. Thus, the high-pressure side compression mechanism 11a to be first started up can be surely protected.

After stopping both mechanisms, the high-pressure side compression mechanism 11a is first started up, and then the low-pressure side compression mechanism 12a can be started up with the low-pressure side pressure difference PLd reduced. As a result, the low-pressure side compression mechanism 12a to be started later is also protected, which can protect both the compression mechanisms.

In this embodiment, at this time, when a reference hold time (10 seconds) has elapsed after the start-up of the high-pressure side compression mechanism 11a, then the low-pressure side compression mechanism 12a is started up. Thus, the low-pressure side compression mechanism 12a can be started up with the low-pressure side pressure difference PLd set to such a level that does not adversely affect the durability and lifetime of the low-pressure side compression mechanism 12a. As a result, both the high-pressure side compression mechanism 11a and the low-pressure side compression mechanism 12a can be surely protected.

In the cycle of the comparative example, in order to protect both the compression mechanisms, means for increasing the throttle opening degrees of both the intermediate-pressure expansion valve 15 and the low-pressure expansion valve 17 can be proposed when stopping the compression mechanisms 11a and 12a. However, the increase in throttle opening degrees of both the intermediate-pressure expansion valve 15 and the low-pressure expansion valve 17 causes the inflow of refrigerant from the discharge side of the low-pressure side compressor 12a to the suction side (evaporator 18 side) thereof, which increases the refrigerant evaporation pressure at the evaporator 18.

Figure 5:
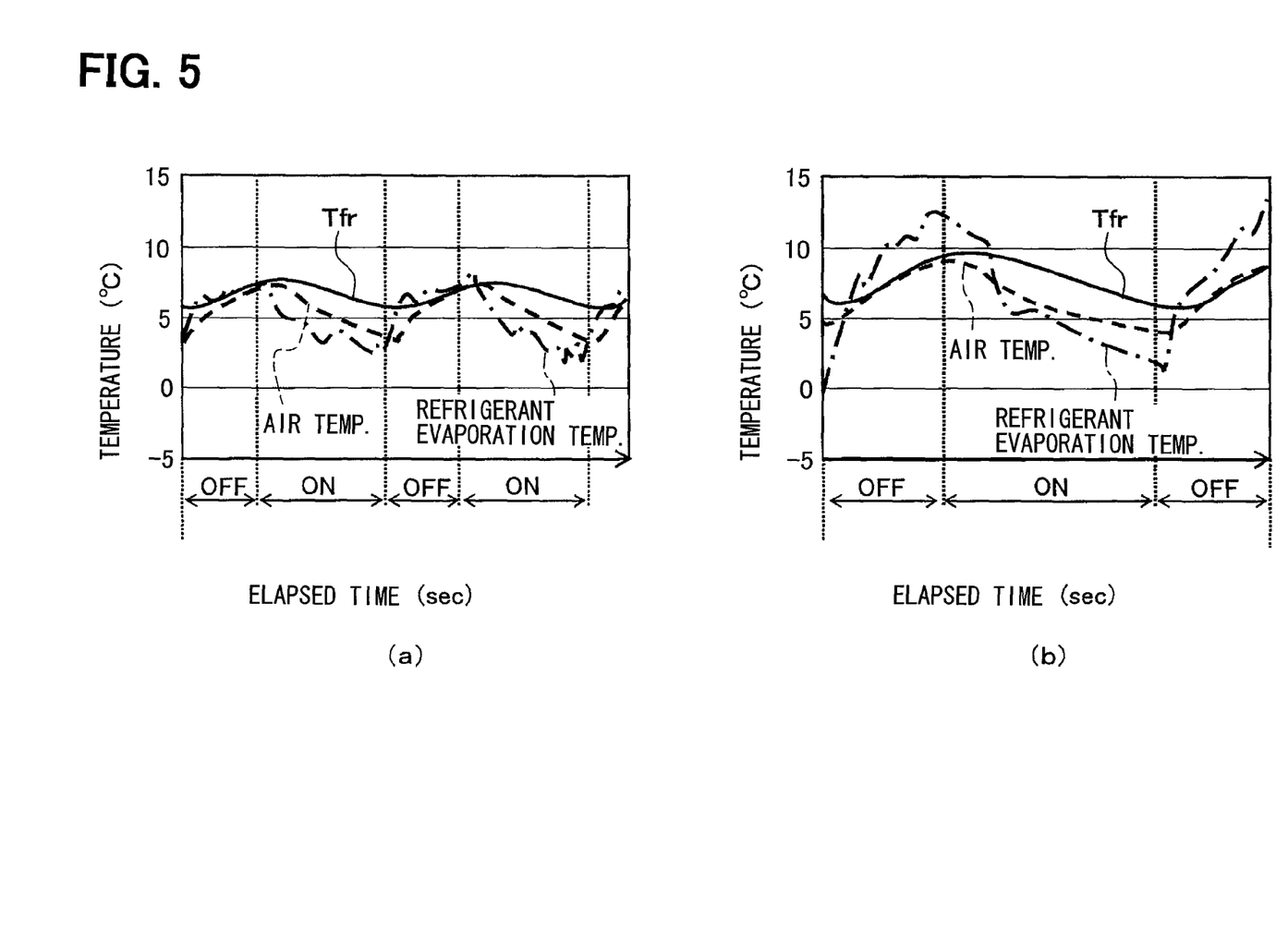

In contrast, in this embodiment, the inflow of refrigerant from the discharge side of the low-pressure side compression mechanism 12a into the suction side (evaporator 18 side) thereof is suppressed not to change the low-pressure suction side refrigerant pressure Ps in the intermittent control of the compression mechanisms 11a and 12a as described with reference to FIG. 3. Thus, this embodiment can suppress variations in refrigerant evaporation pressure at the evaporator 18. This will be described below in comparison with the intermittent control of the above general two-stage compression refrigeration cycle device using FIG. 5.

FIG. 5(a) is a time chart showing changes in air temperature Tfr of the in-freezer air in the freezer (indicated by a solid line), temperature of air blown from the evaporator 18 (indicated by a broken line), and refrigerant evaporation temperature at the evaporator 18 (indicated by an alternate long and short dash line) in the intermittent control of the two-stage compression refrigeration cycle device 10 in this embodiment. FIG. 5(b) is a time chart showing changes in air temperature Tfr of the air in the freezer, temperature of air blown from the evaporator 18, and refrigerant evaporation temperature at the evaporator 18 in the intermittent control of the two-stage compression refrigeration cycle device in the comparative example.

In FIG. 5, for easy understanding, the time charts indicative of the operation timing of the low-pressure side compression mechanism 12a and the high-pressure side compression mechanism 11a are omitted with respect to FIG. 4. The state in which either of the compression mechanisms is operated is indicated by "ON", while the state in which none of the compression mechanisms 11a and 12a is operated is indicated by "OFF".

In the two-stage compression refrigeration cycle device of the comparative example, in the intermittent control of the compression mechanisms 11a and 12a, both compression mechanisms 11a and 12a are simultaneously stopped when the compression mechanisms 11a and 12a are intended to be stopped. When the compression mechanisms 11a and 12a are intended to be started up with the throttle opening degrees of the intermediate-pressure expansion valve 15 and the low-pressure expansion valve 17 increased, both the compression mechanisms are simultaneously started up, while the opening degrees of the intermediate-pressure expansion valve 15 and the low-pressure expansion valve 17 are returned to the previous level taken before stopping the compression mechanisms 11a and 12a under control.

As can be seen from FIG. 5(b), in the two-stage compression refrigeration cycle device of the comparative example, when the compression mechanisms 11a and 12a are stopped, the throttle opening degrees of the intermediate-pressure expansion valve 15 and the low-pressure expansion valve 17 are increased, which drastically changes the refrigeration evaporation temperature at the evaporator 18. That is, the refrigerant evaporation pressure (low-pressure suction side refrigeration pressure Ps) of the evaporator 18 is largely changed.

In contrast, as shown in FIG. 5(a), the two-stage compression refrigeration cycle device 10 of this embodiment suppresses the inflow of refrigerant from the discharge side of the low-pressure side compression mechanism 12a into the suction side (evaporator 18 side) thereof in the intermittent control of the high-pressure side and low-pressure side compression mechanisms 11a and 12a as mentioned above. Thus, this embodiment can prevent the change of the low-pressure suction side refrigerant pressure Ps to thereby suppress variations in refrigeration evaporation pressure at the evaporator 18.

In this way, suppression of variations in refrigerant evaporation pressure at the evaporator 18 is very advantageous in reducing the power consumption of the high-pressure side compression mechanism 11a and the low-pressure side compression mechanism 12a for decreasing the refrigerant evaporation pressure of the evaporator 18.

Second Embodiment

In the first embodiment, in the intermittent control of the high-pressure side compression mechanism 11a and the low-pressure side compression mechanism 12a, the high-pressure side compression mechanism 11a is first stopped, and then the low-pressure mechanism 12a is stopped, as an example. In this embodiment, the high-pressure side and the low-pressure side compression mechanisms 11a and 12a are simultaneously stopped, while the throttle opening of the intermediate-pressure expansion valve 15 is increased and the low-pressure expansion valve 17 is completely closed. The structures and operations of other components except for the above elements in this embodiment are the same as those in the first embodiment.

In this embodiment, even when both the compression mechanisms 11a and 12a are simultaneously stopped in the intermittent control, the throttle opening degree of the intermediate-pressure expansion valve 15 is increased, and the low-pressure expansion valve 17 is completely closed. As a result, the high-pressure side pressure difference PHd can be surely reduced as compared to the low-pressure side pressure difference PLd. Like the first embodiment, when starting up the compression mechanisms 11a and 12a under intermittent control, this embodiment first starts up the high-pressure side compression mechanism 11a, and then the low-pressure side compression mechanism 12a. Accordingly, this embodiment can obtain the same effects as those of the first embodiment.

Third Embodiment

Figure 6:
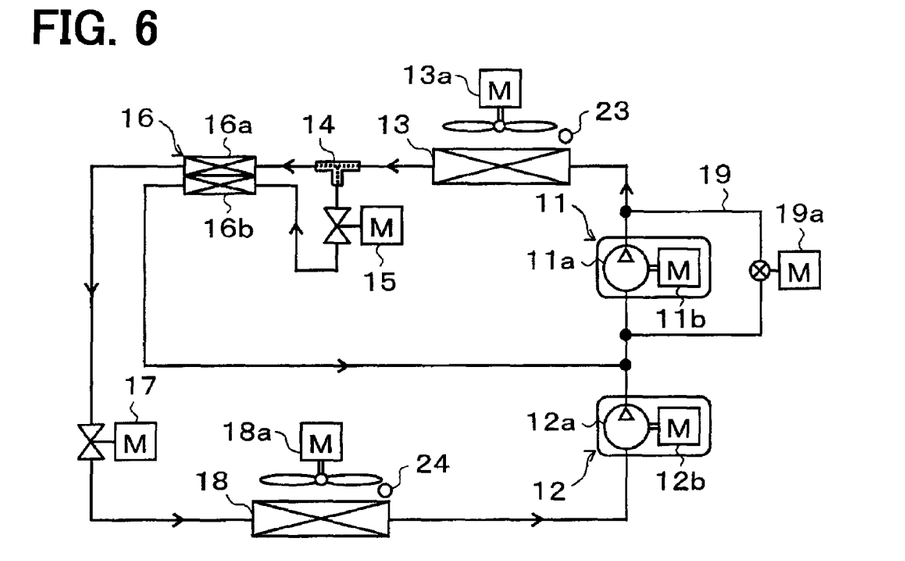
FIG. 6 is an entire configuration diagram of a two-stage compression refrigeration cycle device in a third embodiment.

In this embodiment, unlike the first embodiment, as shown in the entire configuration diagram of FIG. 6, a bypass passage 19 is provided for guiding the refrigerant from the discharge side of the high-pressure side compression mechanism 11a to the suction side thereof, and an opening/closing valve 19a is provided for opening and closing the bypass passage 19, by way of example. The opening/closing valve 19a has its operation controlled by a control signal output from the refrigeration machine controller 20.

In FIG. 6, the same or equivalent parts as those of the first embodiment are indicated by the same reference characters. The same goes for the following drawings. For easy understanding, FIG. 6 will omit the illustration of the refrigeration machine controller 20, the high-pressure side inverter 21, the low-pressure side inverter 22, the operation panel 30, and the connection relationship therebetween.

Further, in this embodiment, in intermittent control of the high-pressure side compression mechanism 11a and the low-pressure side compression mechanism 12a, the high-pressure side and low-pressure side compression mechanisms 11a and 12a are simultaneously stopped, while the opening/closing valve 19a is opened. When the high-pressure side compression mechanism 11a is driven prior to the low-pressure side compression mechanism 12a, the opening/closing valve 19a is closed. The structures and operations of other components except for the above elements are the same as those of the first embodiment.

In this embodiment, even when the compression mechanisms 11a and 12a are simultaneously stopped in the intermittent control, the opening/closing valve 19a can be opened to surely reduce the high-pressure side pressure difference PHd as compared to the low-pressure side pressure difference PLd. Like the first embodiment, when starting up the compression mechanisms 11a and 12a under intermittent control, this embodiment first drives the high-pressure side compression mechanism 11a, and then the low-pressure side compression mechanism 12a. Accordingly, this embodiment can obtain the same effects as those of the first embodiment.

Fourth Embodiment

Figure 7:
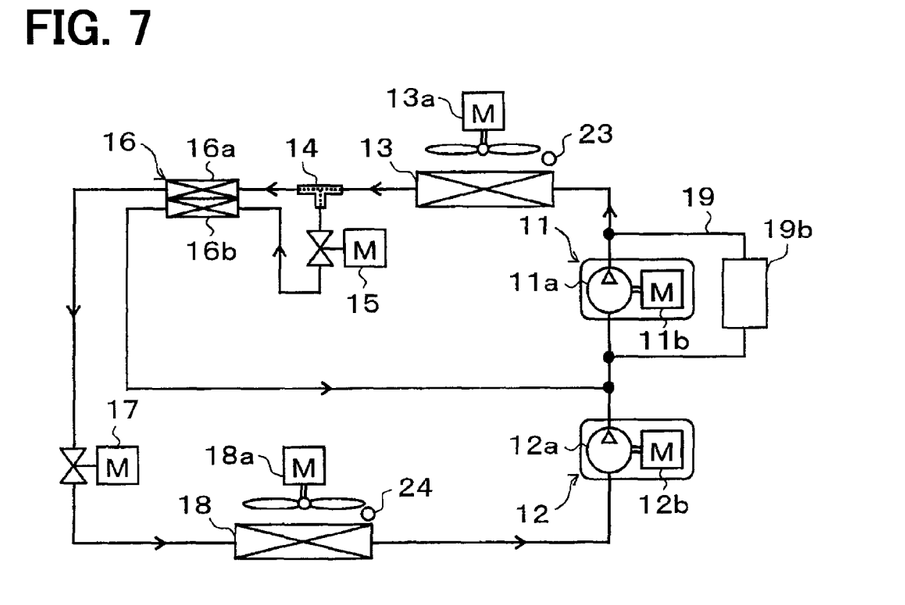
FIG. 7 is an entire configuration diagram of a two-stage compression refrigeration cycle device in a fourth embodiment.

In this embodiment, unlike the first embodiment, as shown in the entire configuration diagram of FIG. 7, an oil separator 19b is provided in the high-pressure side compressor 11, by way of example. The oil separator 19b serves to separate a refrigeration machine oil contained in a refrigerant discharged from the high-pressure side compressor 11 from the refrigerant to return the separated oil to the suction side of the high-pressure side compressor 11. Like FIG. 6 of the third embodiment, for easy understanding, FIG. 7 will omit illustration of the connection relationship of the refrigeration machine controller 20 and the like.

Specifically, the oil separator 19b for use can be of a centrifugal separation type, or a gravity separation type. In the centrifugal separation type, a spinning flow is caused in the refrigerant discharged from the high-pressure side compressor 11 to thereby separate the oil from the refrigerant due to a centrifugal force. In the gravity separation type, the refrigerant discharged from the high-pressure side compressor 11 collides with a wall or the like to have its flow rate decreased, which separates the oil from the refrigerant using a difference in specific gravity between the refrigerant and the oil.

The oil separator 19b of this embodiment is provided only in the high-pressure side compressor 11, and not in the low-pressure side compressor 12. In this embodiment, in the intermittent control of the high-pressure side compression mechanism 11a and the low-pressure side compressor mechanism 12a, both the high-pressure side and the low-pressure side compression mechanisms 11a and 12a are simultaneously stopped. The structures and operations of other components are the same as those of the first embodiment.

Even when the compression mechanisms 11a and 12a are simultaneously stopped in intermittent control, like this embodiment, the oil separator 19b is provided only in the high-pressure side compressor 11, which can return the refrigerant on the discharge side of the high-pressure side compression mechanism 11a to the suction side thereof via the oil separator 19b. Thus, the high-pressure side pressure difference PHd can be surely reduced as compared to the low-pressure side pressure difference PLd without decreasing the low-pressure side pressure difference PLd.

As a result, like the first embodiment, when starting up the compression mechanisms 11a and 12a under intermittent control, this embodiment first drives the high-pressure side compression mechanism 11a, and then the low-pressure side compression mechanism 12a. Accordingly, this embodiment can obtain the same effects as those of the first embodiment.

Other Embodiments

The present invention is not limited to the above embodiments, and various modifications and changes can be made to those disclosed embodiments without departing from the scope of the present invention, as follows.

Figure 8:
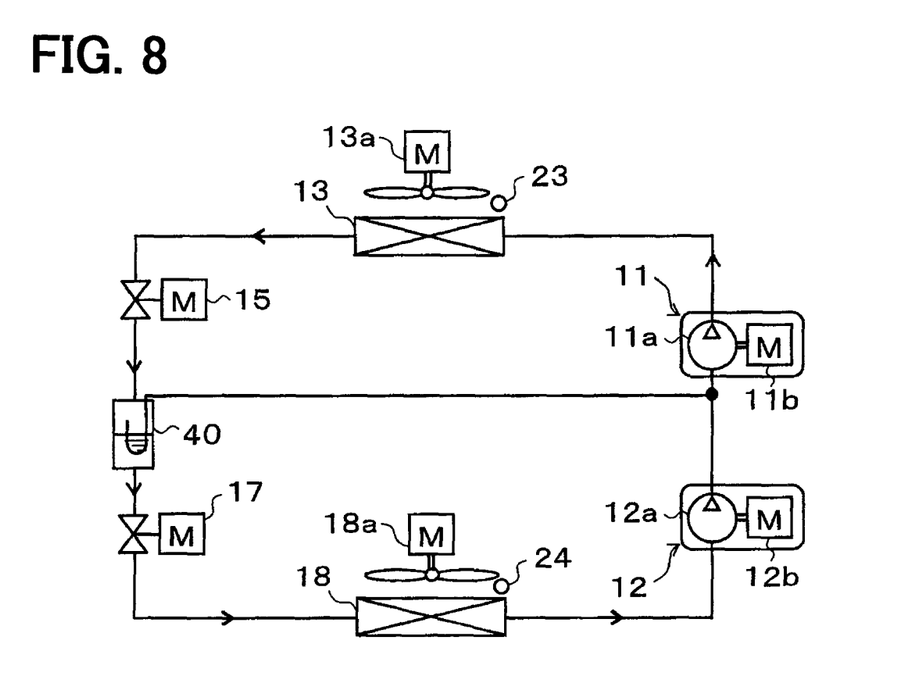
FIG. 8 is an entire configuration diagram of a two-stage compression refrigeration cycle device in another embodiment.

(1) Although in the above embodiments the cycle structure employs the intermediate heat exchanger 16, the two-stage compression refrigeration cycle structure of the invention is not limited thereto. For example, as shown in FIG. 8, the branching portion 14 and the intermediate heat exchanger 16 may be removed, and instead an intermediate gas/liquid separator 40 may be provided for separating the refrigerant flowing from the intermediate-pressure expansion valve 15 into liquid and gas phases.

Further, the gas-phase refrigerant separated by the intermediate gas/liquid separator 40 may be sucked into the high-pressure side compressor 11, while the liquid-phase refrigerant separated by the intermediate gas/liquid separator flows into the low-pressure expansion valve 17, which forms the so-called economizer refrigeration cycle. The refrigeration cycle may perform the intermittent control described in the first to fourth embodiments.

(2) The above embodiments use an electric compressor which drives the compression mechanisms 11a and 12a by the electric motors 11b and 12b, by way of example, but the high-pressure side and low-pressure side compressors 11 and 12 are not limited thereto. For example, the compressor for use may be a clutch compressor which transfers the driving force transmitted from a driving source of the internal combustion engine or the like to the compression mechanism via an electromagnetic clutch or the like. Obviously, one driving means for one of the high-pressure compression mechanism 11a and the low-pressure compression mechanism 12a may be an electric motor, and the other driving means may be an internal combustion engine.

In using the electric compressor, like this embodiment, the refrigerant discharge capacity control of the compressor mechanisms 11a and 12a by controlling the number of revolutions of the electric motors 11b and 12b may be combined with the intermittent control described in the above embodiments. That is, when the target temperature Tset of the in-freezer temperature is set lower than the outside air temperature, the refrigerant discharge capacity is controlled. When a difference between the outside air temperature and the target temperature Tset of the in-freezer temperature is small, and the compressors 11 and 12 do not need to be operated continuously, the intermittent control described in the above respective embodiments may be performed.

(3) In the above embodiments, when the high-pressure side compression mechanism 11a and the low-pressure side compression mechanism 12a are stopped in the intermittent control, the low-pressure expansion valve 17 is completely closed. However, the low-pressure expansion valve 17 has only to have its throttle opening degree maintained or reduced.

That is, since the throttle opening degree of the low-pressure expansion valve 17 is so small that the amount of refrigerant flowing into the suction side (evaporator 18 side) of the low-pressure side compression mechanism 12a via the low-pressure expansion valve 17 becomes small when stopping the high-pressure side compression mechanism 11a in advance. Thus, the increase in refrigerant evaporation pressure of the evaporator 18 can be suppressed only by maintaining or reducing the throttle opening degree of the low-pressure expansion valve 17.

(4) In the above embodiment, the high-pressure side compression mechanism 11a is set as one compression mechanism defined in the accompanied claims, and the low-pressure side compression mechanism 12a is set as the other compression mechanism defined in the claims. Alternatively, the low-pressure side compression mechanism 12a may be defined as one compression mechanism, and the high-pressure side compression mechanism 11a may be defined as the other compression mechanism, which can also protect both the compression mechanism 11a and 12a.

When the low-pressure compression mechanism 12a is stopped in advance in stopping the low-pressure side and high-pressure side compression mechanisms 12a and 11a, the bypass passage 19 and the opening/closing valve 19a as described in the third embodiment, or the oil separator 19b described in the fourth embodiment may be desirably provided in the low-pressure side compressor 12.

When the low-pressure side compression mechanism 12a and the high-pressure side compression mechanism 11a are simultaneously stopped to increase the throttle opening degree of the intermediate-pressure expansion valve 15 like the second embodiment, the oil separator 19b is desirably provided on the high-pressure side compressor 11 side. When the throttle opening degree of the low-pressure expansion valve 17 is increased, the oil separator 19b is desirably provided on the low-pressure side compressor 12 side.

(5) In the above embodiment, in starting up the high-pressure side compression mechanism 11a and the low-pressure side compression mechanism 12a under the intermittent control, when the predetermined hold time has elapsed after start-up of the high-pressure side compression mechanism 11a, then the low-pressure side compression mechanism 12a is started, by way of example. Alternatively, when the low-pressure side pressure difference PLd is equal to or less than a reference pressure difference after start-up of the high-pressure side compression mechanism 11a, then the low-pressure side compression mechanism 12a may be started up.

The reference pressure difference should be determined to be a value that cannot adversely affect the durability and lifetime of the low-pressure side compression mechanism 12a even when the compression mechanism 12a is driven with the low-pressure side pressure difference PLd remaining.

(6) Although in the above embodiments, the two-stage compression refrigeration cycle device 10 of this embodiment is applied to the freezer, the application of the invention is not limited thereto. The invention may be applied to, for example, an air conditioner, a refrigerator, and the like. Further, the invention may be applied to a refrigerating and freezing container for a mobile body (vehicle, or ship) and the like.

The invention claimed is:
1. A two-stage compression refrigeration cycle device, comprising:
a low-pressure side compression mechanism which compresses a low-pressure refrigerant into an intermediate-pressure refrigerant and discharges the compressed refrigerant;
a high-pressure side compression mechanism which compresses the intermediate-pressure refrigerant discharged from the low-pressure side compression mechanism into a high-pressure refrigerant and discharges the compressed refrigerant;
a radiator in which the high-pressure refrigerant discharged from the high-pressure side compression mechanism exchanges heat with outside air to radiate heat from the high-pressure refrigerant;
an intermediate-pressure expansion valve which decompresses and expands the high-pressure refrigerant flowing from the radiator into the intermediate-pressure refrigerant to cause the intermediate-pressure refrigerant to flow to a suction side of the high-pressure side compression mechanism;

a low-pressure expansion valve which decompresses and expands the high-pressure refrigerant flowing from the radiator into the low-pressure refrigerant;

an evaporator in which the low-pressure refrigerant decompressed and expanded by the low-pressure expansion valve is evaporated by exchanging heat with air blown into a cooling space, to cause the evaporated refrigerant to flow to a suction side of the low-pressure side compression mechanism; and a controller including a CPU and a memory, the controller being in communication with both the low-pressure side compression mechanism and the high-pressure side compression mechanism, wherein the controller is programmed to intermittently control the low-pressure side compression mechanism and the high-pressure side compression mechanism such that a temperature of the fluid exchanging heat with the low-pressure refrigerant at the evaporator is adjusted to approach a target temperature, and, the controller is programmed, such that when the low-pressure side compression mechanism and the high-pressure side compression mechanism are to be restarted after both of the compression mechanisms are stopped:

to calculate a low-pressure side pressure difference by subtracting a low-pressure suction side refrigerant pressure from a low-pressure discharge side refrigerant pressure of the low-pressure side compression mechanism, to calculate a high-pressure side pressure difference by subtracting the low-pressure discharge side refrigerant pressure from a high-pressure discharge side refrigerant pressure of the high-pressure side compression mechanism, to compare the low-pressure side pressure difference to the high-pressure side pressure difference, to first start up one of the low-pressure side compression mechanism and the high-pressure side compression mechanism based on the comparison of the low-pressure side pressure difference to the high-pressure side pressure difference, the one compression mechanism being the low-pressure side compression mechanism when the low-pressure side pressure difference is greater than the high-pressure side pressure difference, the one compression mechanism being the high-pressure side compression mechanism when the high-pressure side pressure difference is greater than the low-pressure side pressure difference, and to then start up the other of the low-pressure side compression mechanism and the high-pressure side compression mechanism by reducing the greater one of the low-pressure side compression difference and the high-pressure side compression difference.

2. The two-stage compression refrigeration cycle device according to claim 1, wherein, the controller is further programmed, such that when the low-pressure side compression mechanism and the high-pressure side compression mechanism are stopped, to first stop the one of the low-pressure side compression mechanism and the high-pressure side compression mechanism, and then to stop the other of the low-pressure side compression mechanism and the high-pressure side compression mechanism.

3. The two-stage compression refrigeration cycle according to claim 1, wherein, the controller is in communication with one of the intermediate-pressure expansion valve and the low-pressure expansion valve and is programmed, such that when the low-pressure side compression mechanism and the high-pressure side compression mechanism are stopped, to simultaneously stop the low-pressure side compression mechanism and the high-pressure side compression mechanism while increasing a throttle opening degree of the one of the intermediate-pressure expansion valve and the low-pressure expansion valve.

4. The two-stage compression refrigeration cycle according to claim 1, further comprising
an oil separator provided to separate a refrigeration machine oil contained in the refrigerant discharged by the one compression mechanism from the refrigerant so as to return the oil to the suction side of the one compression mechanism.

5. The two-stage compression refrigeration cycle according to claim 1, wherein
the one compression mechanism is the high-pressure side compression mechanism, and
the other compression mechanism is the low-pressure side compression mechanism.

6. The two-stage compression refrigeration cycle according to claim 1, wherein
the controller is programmed, in starting up the low-pressure side compression mechanism and the high-pressure side compression mechanism, to first start up the one of the low-pressure side compression mechanism and the high-pressure side compression mechanism, and
the controller is programmed, such that when the pressure difference of the other compression mechanism is equal to or less than a predetermined reference pressure difference after the one of the low-pressure side compression mechanism and the high-pressure side compression mechanism is started up, then start up the other of the low-pressure side compression mechanism and the high-pressure side compression mechanism.

7. The two-stage compression refrigeration cycle device according to claim 1, wherein,
the controller is programmed, in starting up the low-pressure side compression mechanism and the high-pressure side compression mechanism, to first start up the one of the low-pressure side compression mechanism and the high-pressure side compression mechanism, and then to start up the other of the low-pressure side compression mechanism and the high-pressure side compression mechanism when a predetermined reference time has elapsed after starting up the one compression mechanism.

8. The two-stage compression refrigeration cycle device according to claim 1, wherein
a branching portion is provided to branch a flow of high-pressure refrigerant from the radiator,
the intermediate-pressure expansion valve is provided to decompress and expand one of high-pressure refrigerant streams branched by the branching portion,
the low-pressure expansion valve is provided to decompress and expand the other one of the high-pressure refrigerant streams branched by the branching portion, and
an intermediate heat exchanger is provided to exchange heat between the low-pressure refrigerant decompressed and expanded by the intermediate-pressure expansion valve and the other one of the high-pressure refrigerant streams branched by the branching portion.

9. The two-stage compression refrigeration cycle device according to claim 1, wherein the controller is in communication with the intermediate-pressure expansion valve, the controller configured to control a throttle opening degree of the intermediate-pressure expansion valve.

10. The two-stage compression refrigeration cycle device according to claim 9, wherein the controller is in communication with the low-pressure expansion valve, the controller configured to control a throttle opening degree of the low-pressure expansion valve.

11. The two-stage compression refrigeration cycle device according to claim 1, wherein the controller is in communication with the low-pressure expansion valve, the controller configured to control a throttle opening degree of the low-pressure expansion valve.

* * * * *